June 18, 1957

T. W. BARNES 2,795,805

THREAD CUTTING APPARATUS WITH IMPROVED DIE HEAD COLLAPSING MEANS

Filed Aug. 27, 1953

8 Sheets-Sheet 1

Tracy W. Barnes, Inventor.

Koenig and Pope, Attorneys.

June 18, 1957 T. W. BARNES 2,795,805

THREAD CUTTING APPARATUS WITH IMPROVED DIE HEAD COLLAPSING MEANS

Filed Aug. 27, 1953 8 Sheets-Sheet 2

Tracy W. Barnes, Inventor.

Koenig and Pope, Attorneys.

June 18, 1957 T. W. BARNES 2,795,805

THREAD CUTTING APPARATUS WITH IMPROVED DIE HEAD COLLAPSING MEANS

Filed Aug. 27, 1953 8 Sheets-Sheet 3

Tracy W. Barnes, Inventor.

Koenig and Pope, Attorneys.

June 18, 1957 T. W. BARNES 2,795,805

THREAD CUTTING APPARATUS WITH IMPROVED DIE HEAD COLLAPSING MEANS

Filed Aug. 27, 1953 8 Sheets-Sheet 4

Tracy W. Barnes,
Inventor.
Koenig and Pope,
attorneys.

June 18, 1957 T. W. BARNES 2,795,805

THREAD CUTTING APPARATUS WITH IMPROVED DIE HEAD COLLAPSING MEANS

Filed Aug. 27, 1953 8 Sheets-Sheet 5

Tracy W. Barnes, Inventor.

Koenig and Pope, Attorneys.

Tracy W. Barnes,
Inventor.
Koenig and Pope,
Attorneys.

June 18, 1957

T. W. BARNES

THREAD CUTTING APPARATUS WITH IMPROVED DIE HEAD COLLAPSING MEANS 2,795,805

Filed Aug. 27, 1953

8 Sheets-Sheet 7

Tracy W. Barnes, Inventor.

Koenig and Pope, Attorneys.

Tracy W. Barnes,
Inventor.
Koenig and Pope,
Attorneys.

2,795,805

THREAD CUTTING APPARATUS WITH IMPROVED DIE HEAD COLLAPSING MEANS

Tracy W. Barnes, Webster Groves, Mo., assignor to John Ramming Machine Company, St. Louis, Mo., a corporation of Missouri Application August 27, 1953, Serial No. 376,822

30 Claims. (Cl. 10—94)

This invention relates to thread cutting apparatus, and more particularly to apparatus for cutting external threads on pipes.

This application is a continuation-in-part of my copending and coassigned application entitled Thread Cutting Apparatus, Serial No. 244,659, filed August 31, 1951, issued as Patent No. 2,694,815, November 23, 1954.

Among the several objects of the invention may be noted the provision of an improved thread cutting apparatus particularly for cutting external threads on pipes; the provision of improved apparatus of this class of the type having tangential receding chasers for cutting taper threads; the provision of apparatus of this class having an improved quick-opening mechanism for effecting retraction of the chasers from the work at the termination of the thread cutting operation; the provision of apparatus of this class wherein the retraction of the chasers is effected automatically in accordance with the length of thread desired by novel and improved means; the provision of apparatus of this class which allows for rapid and accurate adjustment for cutting threads on work of different sizes within the range of the apparatus; the provision of apparatus of this class of such construction as to have relatively large bearing surfaces on all sliding parts; the provision of apparatus of this class having improved mechanism for effecting receding action of the chasers to cut a taper thread and which may be readily set to cut different tapers; the provision of apparatus of this class adapted for successively cutting threads of the same diameter on successive work pieces without requiring any re-setting or re-adjustment between successive cuts; the provision of apparatus of this class which readily allows for making roughing and finishing passes when an exceptionally smooth finish is required; the provision of apparatus of this class in which provision is made for automatic retraction of the die head at the termination of a thread cutting operation; the provision of apparatus of this class which is relatively economical to construct and which operates to provide more even cuts, particularly at slow speed, without binding or chatter; and the provision of apparatus having all the above features which is characterized by rugged simplicity in both operation and adjustment. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a front elevation of a thread cutting apparatus embodying the invention;

Similar reference characters indicate corresponding parts throughout the several views of the drawings.

Figure 1:
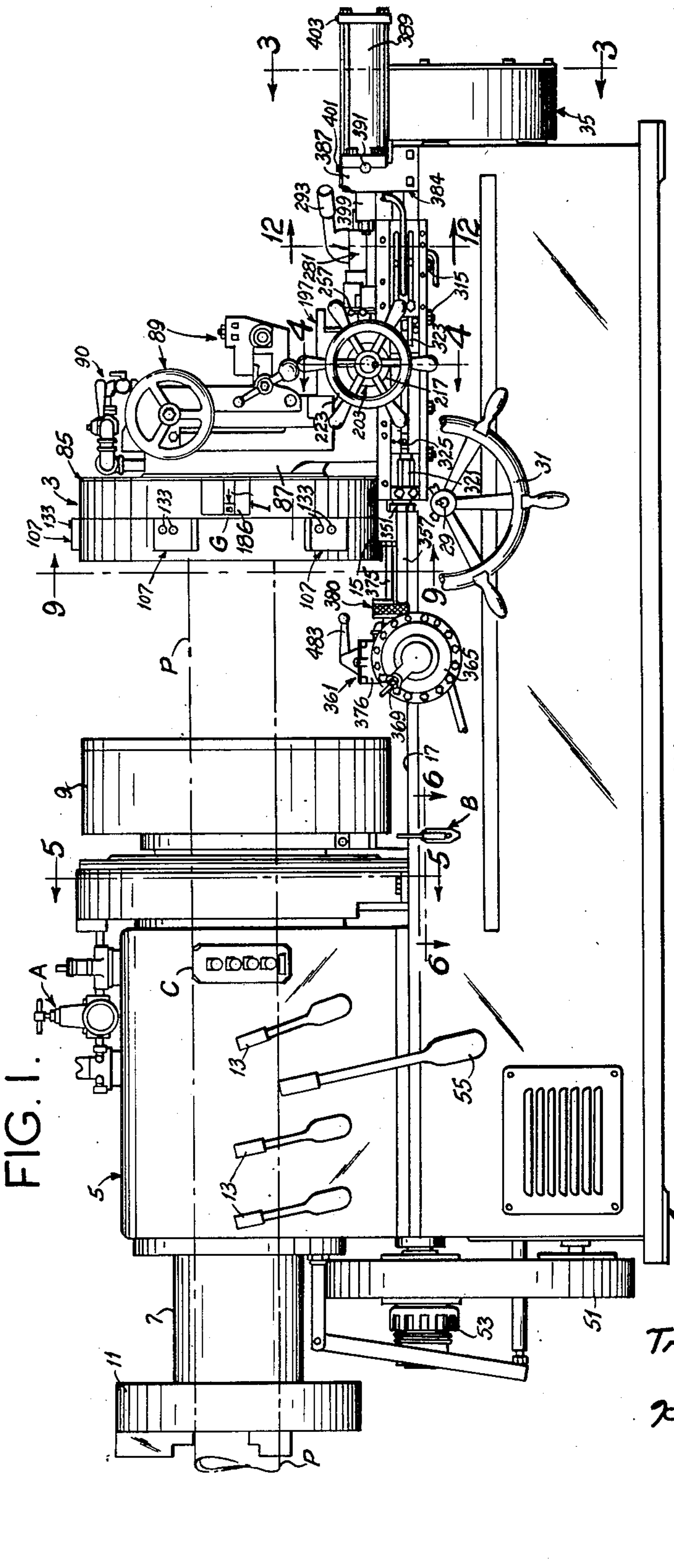
Figures 3, 4:
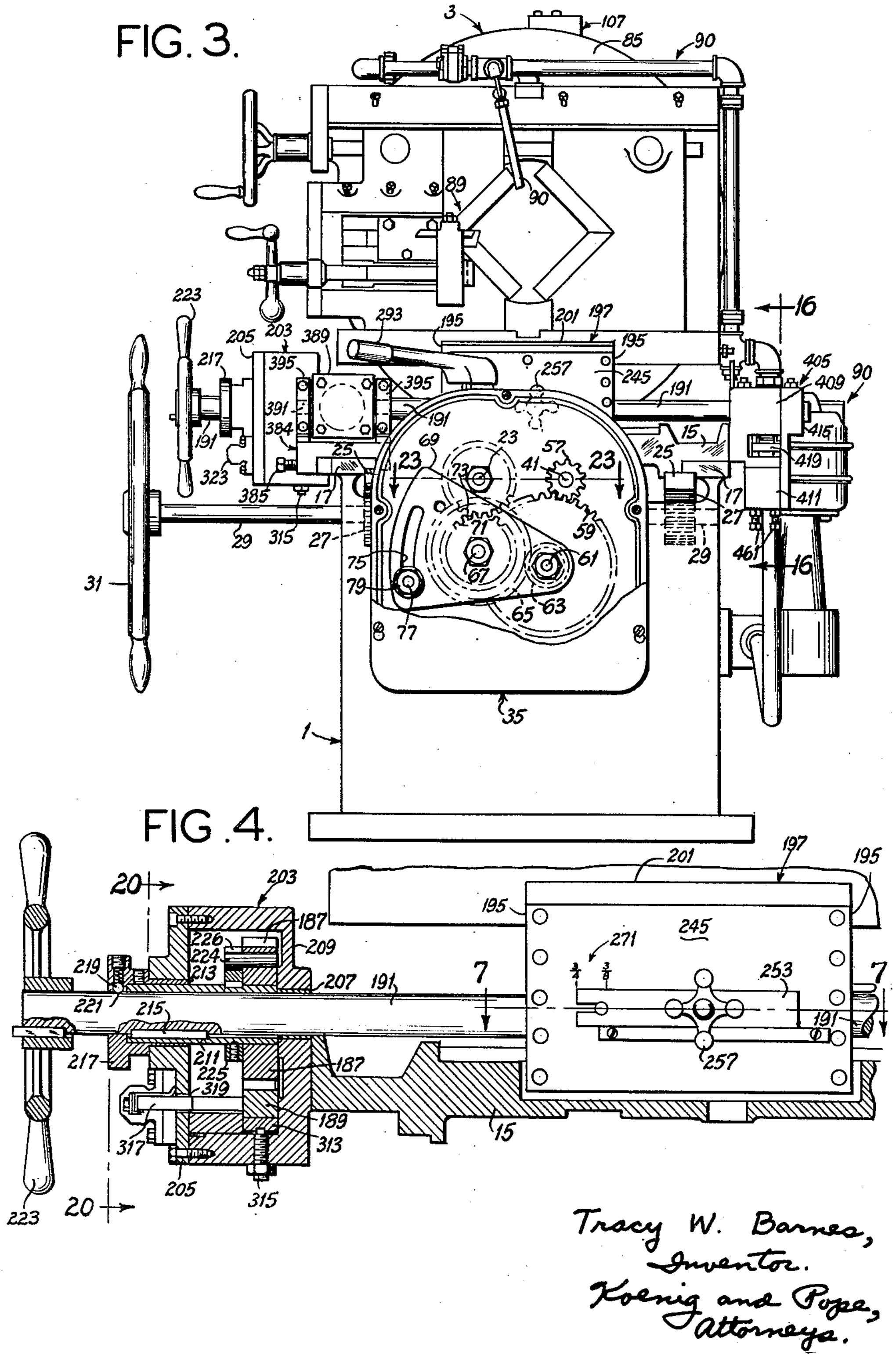
Fig. 3 is an enlarged right end elevation of Fig. 1, with parts broken away on line 3—3 of Fig. 1.
Fig. 4 is an enlarged vertical section taken on line 4—4 of Fig. 1.
Figure 5:
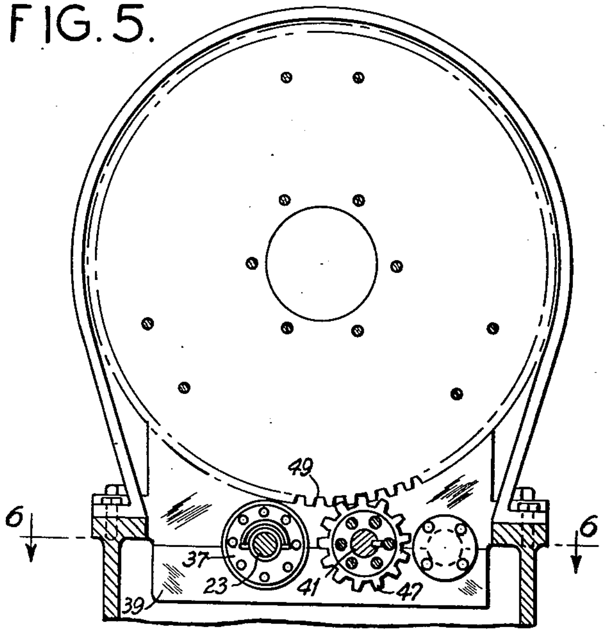
Fig. 5 is an enlarged vertical section taken on line 5—5 of Fig. 1.

Referring to the drawings, first more particularly to Figs. 1 and 3, a pipe threading machine constructed in accordance with the invention is shown to comprise a bed 1 on which a die head 3 is slidable toward and away from a headstock 5 at the left end of the bed as viewed in Fig. 1. Rotary in the headstock is a tubular arbor 7 having an air-operated power chuck 9 at its inboard end and a chuck 11 at its outboard end. The headstock contains speed change gearing, not illustrated in detail as being well known in the art, through which the arbor and chucks are driven. Speed change levers are indicated at 13. Air supply means for the chuck 9 is indicated at A. A control for this chuck is indicated at B. Chuck constructions suitable for chucks 9 and 11 are known and since the details of their construction are not material to this invention, no further description thereof is believed necessary. It will be understood that a pipe P to be threaded is inserted through the arbor 7 and gripped therein by the chucks for rotation, while being held against axial movement. The end of the pipe to be threaded extends out of the chuck 9 to the right as viewed in Fig. 1.

The die head 3 is mounted on a carriage 15 movable on ways 17 on opposite sides of the bed. The carriage floats on spring-loaded roller bearings 19 (Fig. 14) to reduce sliding friction. The carriage has a split nut 21 (Fig. 12) adapted to mesh with a lead screw 23 for driving the die head toward the headstock. The carriage also has a pair of longitudinally extending racks 25 (see Figs. 3, 12 and 14) engaged by pinions 27 on a shaft 29 having a handwheel 31 for manually moving the carriage when the split nut is released. The lead screw is journalled at its right end in a bearing 33 (Fig. 23) in a change gear housing 35 at the right end of the bed and is journalled at its left end in a bearing 37 (Figs. 5 and 6) carried by a bearing plate 39 of the headstock. The lead screw is driven through change gearing in the housing 35 from a connecting shaft 41 (Figs. 3, 5, 6 and 23). Shaft 41 is journalled at its right end in a bearing 43 (Fig. 23) in the housing 35 and is fixed at its left end (Fig. 6) to the output shaft 45 of the headstock to be driven thereby. Shaft 45 carries a pinion 47 (Figs. 5 and 6) in mesh with a gear 49 on the arbor 7 for driving the arbor. The power input to the headstock is derived from an electric motor (not shown) housed in the bed through a drive in a housing 51 (Fig. 1) and a clutch 53 controlled by a lever 55. A push button control for the motor is shown at C in Fig. 1.

Figures 20, 21, 22, 23:
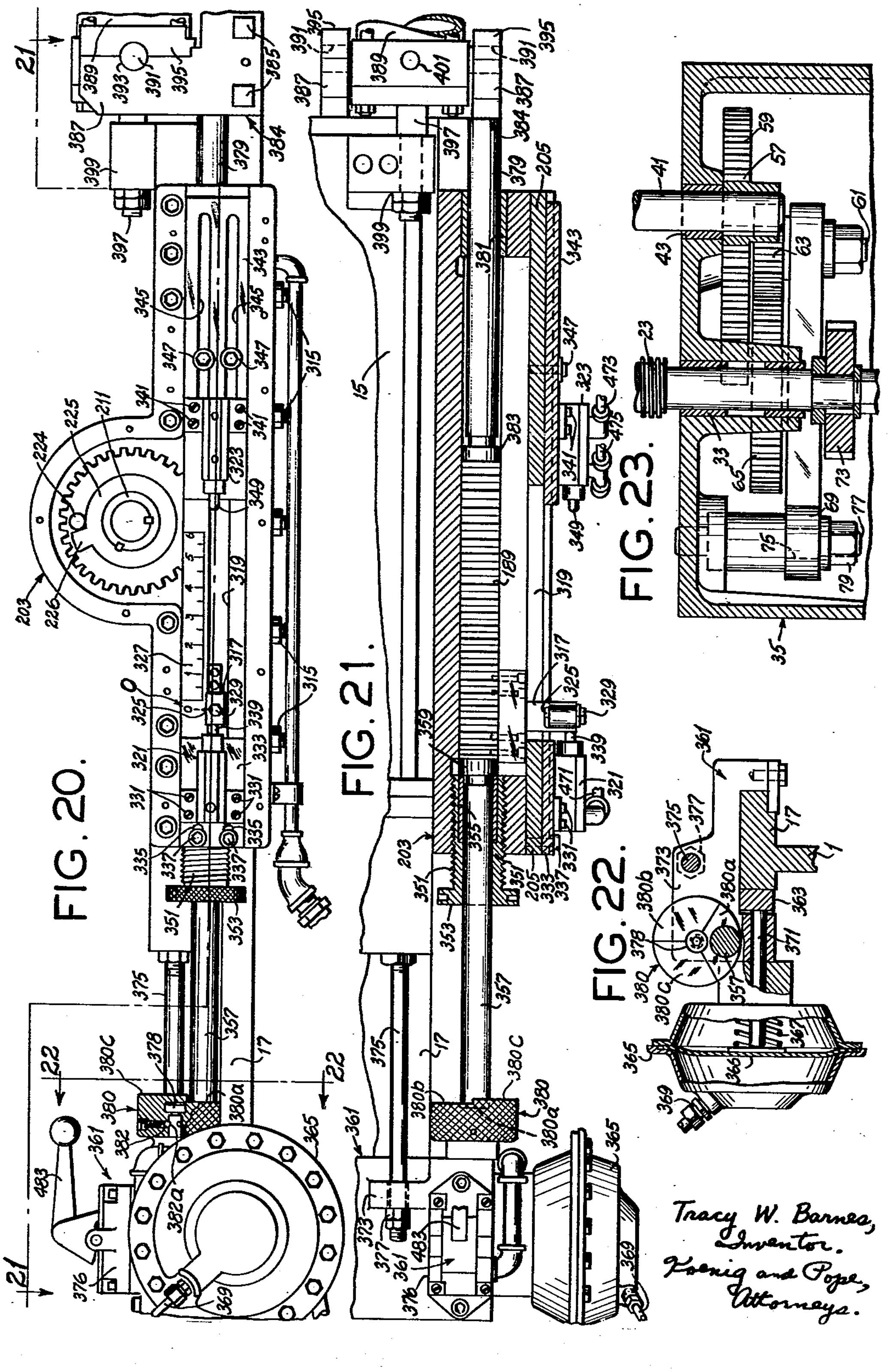
Fig. 20 is a vertical section taken on line 20—20 of Fig. 4.
Fig. 21 is a horizontal section taken on line 21—21 of Fig. 20.
Fig. 22 is a vertical section taken on line 22—22 of Fig. 20, with parts further broken away and shown in section.
Fig. 23 is an enlarged section taken on line 23—23 of Fig. 3.

The change gearing in housing 35, illustrated in Figs. 3 and 23, comprises a pinion 57 fixed on the end of shaft 41 in mesh with a gear 59 on a fixed stud 61. Gear 59 is part of a cluster having a pinion 63. Pinion 63 is in mesh with a gear 65 on a stud 67 journalled in a sector plate 69 swingable on the stud 61. Fixed on the stud 67 is a pinion 71 in mesh with a change gear 73 on the end of the lead screw. The sector plate has an arcuate slot 75 receiving a fixed stud 77 having a nut 79 threaded thereon for locking the sector plate in adjusted position. Change gears of different sizes may be used at 73 to change the speed of the lead screw to cut threads of different pitch (for example, 8, 10 or 11½ threads per inch).

Figures 9, 9A, 10:
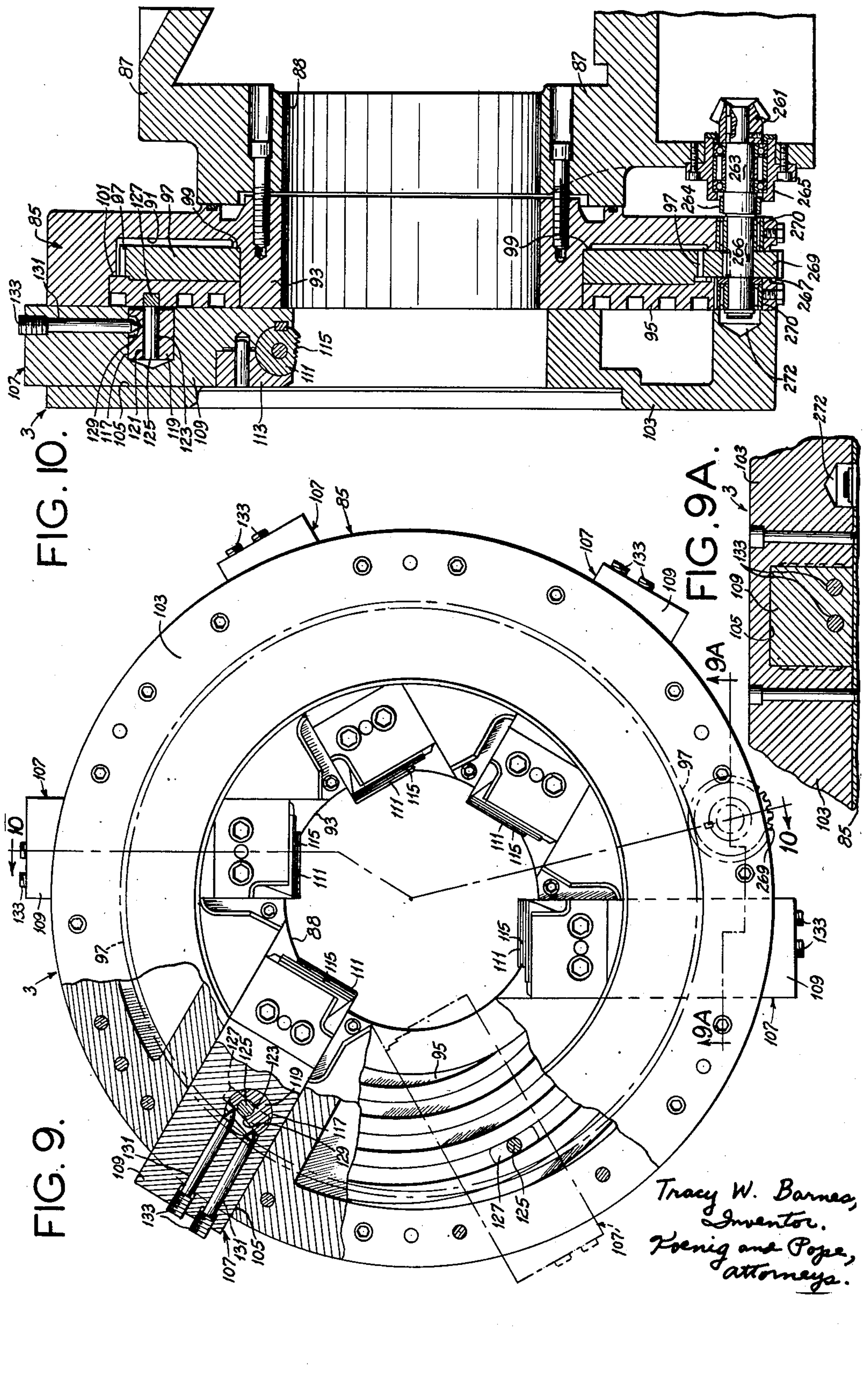
Fig. 9 is a view taken on line 9—9 of Fig. 1, with parts broken away and shown in section.
Fig. 9A is a section taken on line 9A—9A of Fig. 9.
Fig. 10 is a section taken on line 10—10 of Fig. 9.

The die head 3, illustrated in detail in Figs. 9, 9A and 10, comprises a ring-shaped body 85 having a central opening sufficiently large to receive a pipe of the largest diameter within the range of the machine. The die head body 85 is carried by a stand 87 (also see Fig. 1) mounted on the carriage 15 in axial alignment with the arbor 7. The stand has an opening 88 in line with the opening in the body 85. It carries mechanism generally indicated at 89 for cutting off, beveling and reaming the end of a pipe chucked in the headstock and extending through the openings in the die head and stand. Fig. 3 also shows means 90 for pumping coolant. Mechanism 89 and means 90 are known in the art and since they do not constitute a part of this invention will not be further described.

In the side of the die head body 85 toward the headstock is an annular recess 91 providing a hub 93. Rotary in the recess on the hub is a scroll ring 95. Fixed to the back face of the scroll ring (its face away from the headstock) is a gear 97 of smaller diameter than the scroll ring. This gear is received in recess 91 in back of the scroll ring and is rotary on the hub 93. It abuts an annular shoulder 99 at the inner end of the hub. The scroll ring, adjacent its periphery, abuts an annular shoulder 101. The scroll ring and gear assembly is held in the recess 91 by a ring-shaped cover 103. In the side of the cover toward the body 85 are grooves 105 constituting tangential guideways for chaser holders 107. Six guideways 105 and six chaser holders are shown.

Each chaser holder 107 comprises a block 109 having a sliding fit in its respective guideway 105. A tangential chaser 11 is held clamped to the block at its inner end by a clamp 113. The chaser has a thread cutting face 115 transverse to the direction of movement of the holder. The chasers and the arrangement for clamping them in place at the inner end of the holder are more particularly described and claimed in my copending application entitled Thread Chaser and Chaser Assembly, Serial No. 243,142, filed August 22, 1951 issued as Patent No. 2,667,651, February 2, 1954. Each block has a cylindrical recess 117 in its side toward the scroll ring 95. A roll 119 having an eccentric bore 121 is rotary in the recess. A scroll ring follower 123 has a stem 125 rotary in the base 121 and a head 127 received in the spiral groove of the scroll ring. The roll 119 has a transverse groove 129. Openings 131 reach from the outer end of the block 109 to the recess 117. Adjusting screws 133 threaded in the outer ends of the openings have their inner ends in engagement with the bottom of the groove 129. By adjustment of the screws, the roll 119 may be rotated to adjust the position of the block 109.

From the above, it will be seen that upon rotation of the scroll ring in one direction, the holders 107 and chasers 111 are moved outward, and upon rotation of the scroll ring in the opposite direction, the holders and chasers are moved inward. On the periphery of the scroll ring 95 are graduations G (Fig. 1) corresponding to sizes of pipe within the range of the apparatus. These are visible singly through a window opening 186 (Fig. 1) in the die head body 85 toward the front of the apparatus, an index I being scribed on the body beside the window. The graduations G are so phased that when the scroll ring is rotated to a position wherein a particular pipe size graduation is visible in the window in line with the index mark, the cutting edges of the chasers are positioned for cutting pipe of that size. Adjustment of the chasers for equal distribution of cut is made by adjusting the screws 133.

In order to provide for receding action of the chasers as the die head is advanced toward the headstock by the lead screw to cut a taper thread, I provide a novel mechanism for effecting continuous controlled rotation of the scroll ring in response to movement of the die head toward the headstock. This mechanism comprises a train of gears carried by the carriage 15 for movement with the die head, the last gear of this train being the gear 97. The first or driving gear of this train is a pinion designated 187 (Figs. 2 and 4) and derives its rotation by rolling on a rack 189 as the carriage and die head are moved toward and away from the headstock. The train incorporates a speed selector generally designated 190 (Fig. 7) for varying the speed ratio as between the driving pinion 187 and the last gear 97.

More particularly, the train of gears comprises a shaft 191 (Figs. 2, 3, 4 and 7) extending transversely of the bed journalled in bearings 193 in the side walls 195 of a selector gear box 197 and extending forward from the box toward the front side of the apparatus. The side walls 195 of the box 197 and its forward end wall 199 and top wall 201 are formed as integral parts of the die stand 87. Fixed to the carriage 15 on the front side of the apparatus is a pinion and rack housing 203. This housing extends longitudinally of the apparatus, and has a front cover plate 205. The shaft 191 extends transversely through the housing and cover plate, being journalled in a bearing 207 in the backwall 209 of the housing (Fig. 4), and extending through a sleeve 211 journalled in a bearing 213 in the cover plate. The sleeve 211 is axially slidable in the bearing 213 and on the shaft 191, and is slidably keyed to the shaft as indicated at 215. The sleeve carries the driving pinion 187.

The sleeve 211 extends out from the cover plate 205 and has a knob 217 fixed upon its outer end. This knob carries a spring-biased detent 219 engageable in a notch 221 in the shaft 191 to hold the knob, the sleeve and the pinion 187 in the position illustrated in Fig. 4 wherein the pinion is in mesh with the rack. By pulling out on the knob, the pinion 187 is moved to the left as viewed in Fig. 4 out of mesh with the rack. On the outer end of the shaft 191 is a handwheel 223 for manually turning the shaft.

The driving pinion 187 is rotary on the sleeve at the inner end of the latter. A lost-motion connection between the pinion and the sleeve is provided by a forwardly projecting pin 224 on the pinion and a collar 225 fixed on the sleeve in front of the pinion having a dog 226 for engagement by the pin.

Figure 8:
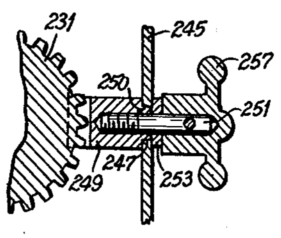
Fig. 8 is an enlarged vertical section taken on line 8—8 of Fig. 7.
Figures 6, 7:
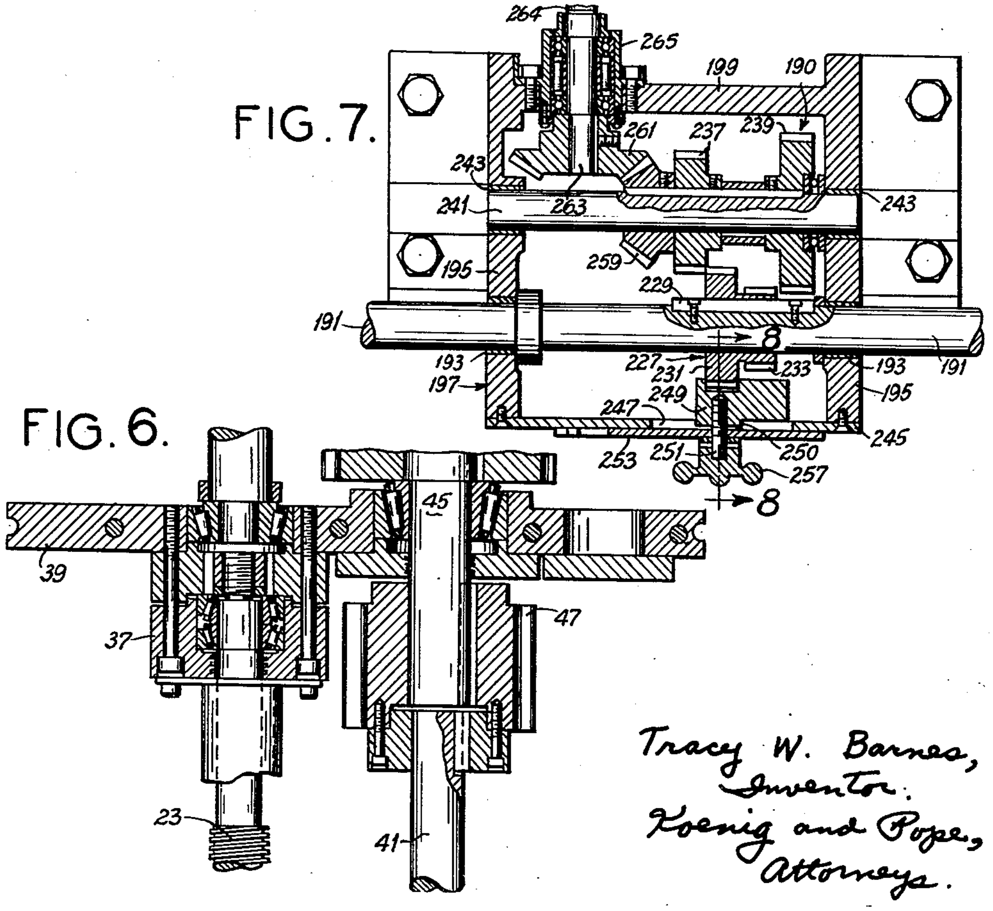
Fig. 6 is an enlarged horizontal section taken on line 6—6 of Figs. 1 and 5.
Fig. 7 is a horizontal section taken on line 7—7 of Fig. 4.

A two-gear cluster 227 is axially slidable on the shaft 191 in the box 197 and keyed to the shaft as indicated at 229 for rotation therewith (Fig. 7). The gears of the cluster are designated 231 and 233. These are adapted selectively to mesh with gears 237 and 239, respectively, fixed on a countershaft 241 journalled at its ends in bearings 243 in the side walls 195 of the box 197 extending parallel to the shaft 191. The open end of the box is closed by a cover plate 245. This has a narrow horizontal slot 247. A shifter fork 249 straddling gear 231 has a narrow key 250 (Fig. 8) slidable in the slot. The fork is threaded on a screw 251 rotary in a plate 253 slidable on the face of cover plate 245 over the slot 247. Fixed on the outer end of the screw 251 is a handwheel 257. By turning the handwheel to draw the fork against the inside of the cover plate 235, the fork may be clamped in position to hold the cluster 227 in a desired speed setting. A bevel gear 259 is fixed on the countershaft 241. This gear is in mesh with a bevel pinion 261 fixed on a shaft 263 journalled in a bearing 265 in the forward end wall 199 of the box 197. The shaft 263 extends longitudinally of the apparatus out of the box 197 to a connection at 264 with a coaxial shaft 266 spanning a recess 267 in the die head body 85 (Fig. 10). Fixed on the shaft 266 in this recess is a pinion 269 in mesh with the scroll ring gear 97. The shaft 266 is journalled in bearings 270 in the body 85 on opposite sides of the recess 267 and its end toward the headstock is accommodated in a recess 272 in the cover 103.

Figure 2:
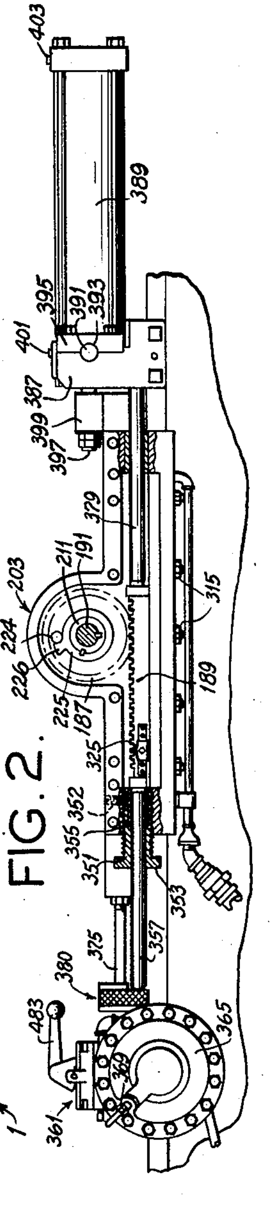
Fig. 2 is an enlarged fragment of Fig. 1, with parts broken away and shown in section.

The arrangement is such that, assuming that the rack 189 is held against movement and that the pin 224 on pinion 187 is engaged against the right side of the dog 226 as viewed in Fig. 2, as the carriage is moved toward the headstock the pinion 187 rolls on the rack 189, rotating counterclockwise, and drives the shaft 191 counterclockwise via the pin 224, the dog 226, the collar 225, the sleeve 211 and the key connection 215 between the sleeve 211 and the shaft. How the rack is held against movement will be later described. Counterclockwise rotation of the shaft 191 effects rotation of the gear 97 and the scroll ring 95, through whichever of gear sets 231 and 237 or 233 and 239 is in mesh, and through bevel gears 259 and 261 and pinion 269, in such direction as gradually to move the chaser holders outward. The rate of movement may be changed in accordance with the taper of the thread to be cut by shifting the cluster 227 to establish a speed ratio appropriate for that taper. This is accomplished by turning the handwheel 257 to loosen the fork 249 from clamping engagement with the inside of cover plate 245 and shifting the fork (and the plate 253) to shift the cluster 227, then re-clamping. The left edge of the plate 253 is utilized as an index in conjunction with taper gauge marks 271 on the cover plate (Fig. 4) to indicate the setting. Clockwise rotation of the shaft 191 effects rotation of the scroll ring 95 in the opposite direction thereby to effect inward movement of the chaser holders.

Figures 11, 12, 13, 14, 15:
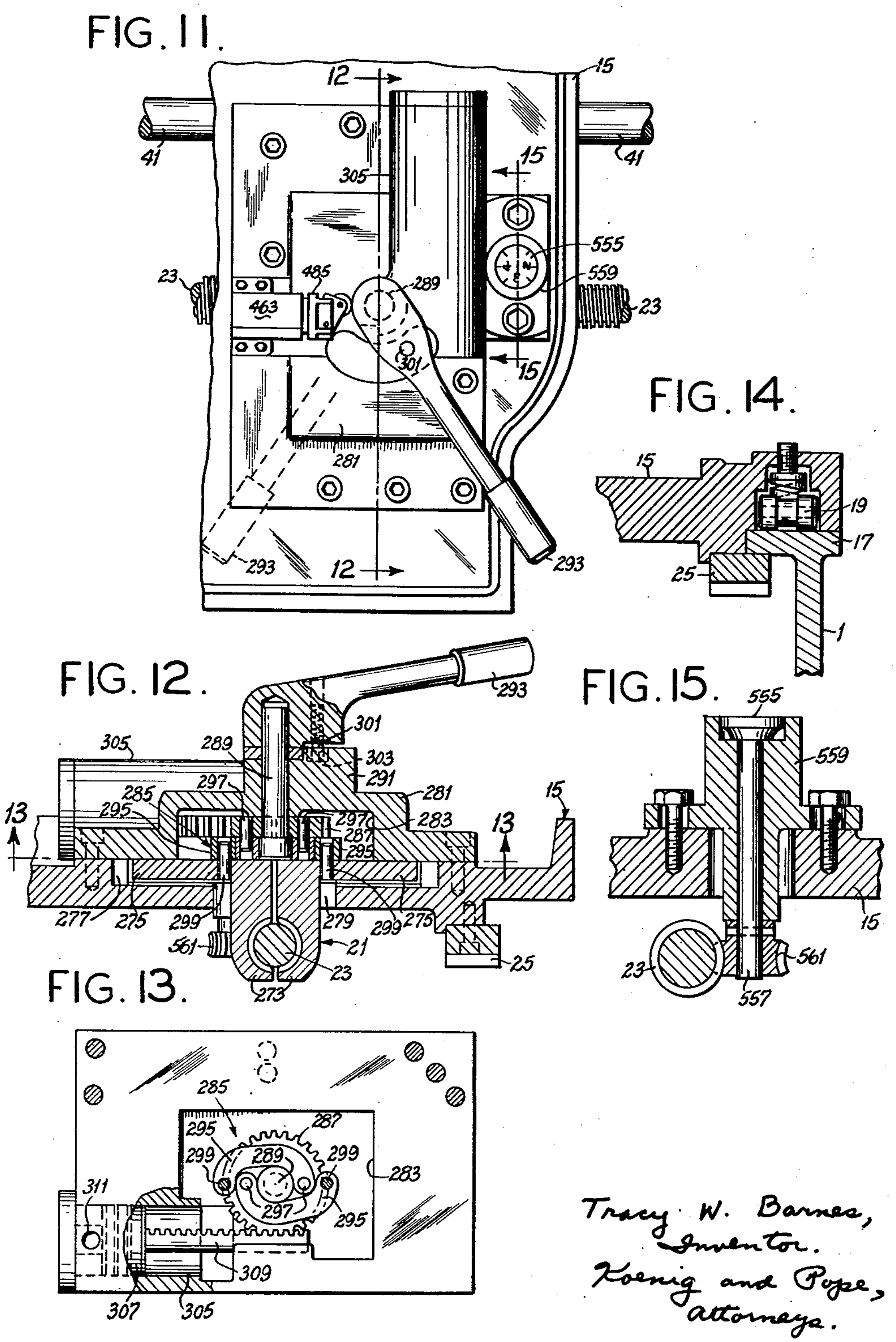
Fig. 11 is an enlarged fragmentary plan of a carriage of the apparatus.
Fig. 12 is a vertical section taken on line 12—12 of Figs. 1 and 11, on the same scale as Fig. 11.
Fig. 13 is a section taken on line 13—13 of Fig. 12.
Fig. 14 is a detail section illustrating a roller bearing for the carriage.
Fig. 15 is a vertical section taken on line 15—15 of Fig. 11.

The split nut 21 which is adapted to be engaged with the lead screw 23 for driving the carriage 15 consists of a pair of half-nuts 273 (Fig. 12). These are formed as integral parts of slide plates 275 which are slidable toward and away from one another transversely of the carriage 15, being guided in a recess 277 in the carriage. The half-nuts extend downward through an opening 279 in the carriage on opposite sides of the lead screw 23. The slide plates 275 are held in the recess 277 by a housing 281 fixed to the carriage. This housing has a recess 283 accommodating a crank mechanism 285 (Fig. 13) for moving the half-nuts toward and away from one another.

The crank mechanism 285 comprises a pinion 287 fixed on a vertical shaft 289 journalled in a boss 291 on the top of the housing 281. Fixed on the upper end of the shaft is a handle or lever 293. The pinion 287 is coupled to the slide plates 275 by a pair of C-shaped links 295 pin-connected at 297 to the pinion and at 299 to the slide plates. The pins at 297 function as crank pins. They are located on opposite sides of the vertical axis of the shaft 289. One link 295 extends from one pin 297 around one side of the shaft 289 to its pin connection at 299 to one slide plate, and the other link extends from the other pin 297 around the other side of the shaft to its pin connection at 299 to the other slide plate. The arrangement is such that when the pinion turns counterclockwise as viewed in Fig. 13, the slide plates 275 and the half-nuts are spread apart, and when the pinion is turned clockwise, the half-nuts are moved into meshing engagement with the lead screw 23. The lever 293 carries a spring-biased detent 301 engageable in a recess 303 in the top of the boss 291 to hold the lever and pinion 287 in the position for engagement of the half-nuts and the lead screw.

The housing 281 is also formed with an air cylinder 305 (Figs. 11–13), the axis of this cylinder extending horizontally and transversely of the carriage 15, and in the plane of and generally tangent to the pinion 287. A piston 307 is slidable in the cylinder. A rack 309 is operated by the piston and meshes with the pinion 287. The cylinder has a port 311 behind the piston. The piston has a retracted position illustrated in Fig. 13. When air under pressure is supplied to the cylinder through the port 311, the piston and rack are moved forward to rotate the pinion 287 from its half-nut-engaging position illustrated in Fig. 13 to disengaging position. By venting the cylinder through the port 311, the piston may be returned to retracted position upon manually turning the lever 293 to engage the half-nuts with the lead screw 23.

Referring now to Figs. 2, 4, 20 and 21, the rack 189 is shorter than its housing 203 to be capable of longitudinal movement therein. It is slidable relative to the housing on a gib 313 adjustably positioned above the bottom of the housing 203 by adjusting screws 315. Adjacent its forward end toward the headstock, it carries an arm 317 which extends through an elongate horizontal slot 319 in the front cover plate 205 of the housing. This arm serves as a trip for two air valves 321 and 323 which are carried on the front cover plate 205 at the ends of the slot 319. It also carries a pointer 325 cooperable with a thread length scale 327 on the front cover plate 205. The pointer is shiftable relative to the arm 317 longitudinally of the apparatus, being retained in adjusted position by a screw 329. Each chaser has a throat presenting a wide cutting edge to prolong its useful life. The chasers travel through a distance corresponding to the throat length before they actually start to cut a thread. Accordingly, the thread length scale starts at a point spaced from a zero mark 0 a distance corresponding to the throat length. This allows for pre-travel of the chasers for a distance equal to the throat length before threading actually starts.

The air valve 321 is adjustably positioned on the front cover plate 205 adjacent its forward end toward the headstock. For the purpose of adjusting the valve longitudinally with respect to the plate 205, the valve is fixed by screws 331 to an adjusting plate 333. This plate has two horizontal slots 335. Screws 337 extend through these slots and are threaded in the cover plate 205. By loosening the screws 337, the adjusting plate 333 and valve 321 may be adjusted longitudinally relative to the cover plate, and the screws then tightened to hold the valve in adjusted position. The operating button 339 of the valve extends in rearward direction away from the headstock.

The air valve 323, which is a stop valve, is adjustably positioned on the front cover plate 205 at the rearward end of the slot 319. For the purpose of adjusting this valve longitudinally with respect to the plate 205, it is fixed by screws 341 to an adjusting plate 343. This plate has two elongate horizontal slots 345. Screws 347 extend through these slots and are threaded in the cover plate 205. By loosening the screws 347, the adjusting plate 343 and stop valve 323 may be adjusted longitudinally relative to the cover plate, and the screws then tightened to hold the valve in adjusted position. The operating button 349 of the stop valve 323 extends forward toward the headstock.

A rack adjusting sleeve 351 is threaded in the end of the housing 205 toward the headstock. A set screw 352 (Fig. 2) is provided for locking the sleeve in adjusted position. The sleeve has a knurled knob 353 on its outer end and a bushing 355. Slidable in the sleeve is a stop rod 357. This has a head 359 on its rearward end within the housing engageable on one side by the forward end of the rack 189 and on its other side by the inner end of the sleeve. The forward end of the stop rod toward the headstock is engageable with an air-operated bead clamp generally designated 361 (Figs. 2 and 22) which functions as a stop to prevent forward movement of the rod and rack.

The clamp 361 (see Figs. 20–22) comprises a C-shaped body (Fig. 22) which is slidable on the way 17 at the front of the bed 1. It has a movable jaw 363 actuated by an air pressure device 365. The latter comprises a chamber having a diaphragm 366 (see Fig. 22) adapted to be moved against the bias of a spring 367 upon introduction of air under pressure through a port 369. A connecting rod 371 extends from the diaphragm to the jaw 363. When air is supplied to the chamber, the jaw 363 is moved to clamp to the way 17. When the chamber is vented through port 369, the jaw is released to allow the bed clamp to slide on the way. The C-shaped clamp body 361 has an upstanding apertured lug 373. A carriage stop adjusting rod or screw 375 extends from the forward end of the carriage 15 loosely through this lug, and has an abutment or nut 377 adjustably threaded on its forward end forward of the lug. A manually operable air valve 376 is mounted on top of the clamp body 361.

A shaft 378 is fixed in the clamp body 361 and extends rearward (i. e., in the direction away from the headstock) toward the carriage 15. Rotary on the shaft 378 is a cut adjusting head 380. The face of the head toward the carriage 15 is formed as three steps 380*a*, 380*b* and 380*c*, each spanning 120° of arc. The head is rotary to any one of three positions determined by engagement of a spring-biased ball detent 382 carried by the head in one of three ball sockets 382*a*, in the shaft 378 and spaced at 120° intervals to bring any one of the three steps into position for engagement by the forward end of the stop rod 357. As will be made clear, engagement of the forward end of the stop rod 357 with the innermost step 380*a* determines a finish-cut position of the chasers, engagement of the forward end of the rod 357 with the intermediate step 380*b* determines a rough-cut position of the chasers for one taper (for example, ¾" per foot), and engagement of the forward end of the rod with the highest or outermost step 380*c* determines another rough-cut position of the chasers for another taper (for example, ⅜" per foot).

A stop rod 379 (Figs. 2, 20 and 21) is slidable in a bushing 381 in the rearward end of the housing 205. This has a head 383 on its forward end within the housing engageable by the rearward end of the rack 189. The rearward end of the rod 379 is engageable with a carriage stop clamp 384. This consists of a C-shaped body (see Fig. 3) clamped to the way 17 at the front of the bed by set screws as indicated at 385. The clamp 384 has upstanding sides 387 between which is received the forward or rod end of a single-acting carriage-return air cylinder 389. The cylinder 389 has trunnions 391 at its rod end received in openings 393 formed half in the rearward edges of sides 387 and half in the forward edges of caps 395 held to the sides 387 by screws. The cylinder 389 projects horizontally rearward from the bed 1. It has a piston from which a piston rod 397 extends forward through its rod end to a connection at 399 with the carriage 15. The cylinder has a transfer port 401 at its rod end and an exhaust port 403 at its other or head end. By admitting air under pressure through transfer port 401, the piston rod 397 may be retracted to pull the carriage 15 rearward to a retracted position against the stop clamp 384. By venting the rod end of the cylinder via the transfer port, the carriage is permitted to move forward.

Quick-opening mechanism for effecting retraction of the chasers at the termination of a thread-cutting operation is shown in Figs. 16–19. This mechanism acts through the shaft 191 to rotate the scroll ring 95 via whichever of gear sets 231 and 237 or 233 and 239 is in mesh, and via bevel gears 259 and 261, pinion 269 and gear 97, at the termination of a thread cutting operation to effect a quick outward movement of the chasers. This quick retraction of the chasers via rotation of shaft 191 is permitted by the lost-motion connection between the pinion 187 and the sleeve 211.

More particularly, the quick-opening mechanism comprises a housing generally designated 405 mounted on the back of carriage 15 at the back of the bed 1 and extending longitudinally of the apparatus. The housing has a relatively long shallow section 407 at the end of which opposite the headstock end of the apparatus is an upper friction wheel chamber 409 and a lower spring chamber 411. The shaft 191 extends from the selector gear box 197 into the friction wheel chamber 409, being journalled in bearings 413 in the side wall of the housing adjacent the carriage and in a cover 415 for housing 405. Keyed on the shaft 191 in the housing section 409 is a friction wheel 417 made, for example, of cold rolled steel. An elongate flat block 419 is longitudinally slidable on tracks 421 formed on the bottom of housing section 407. At its forward end (i. e., its end toward the headstock) the block has a recess 423 accommodating a transverse pivot pin 425. A double-acting air cylinder 427 has its rod end fixed to the forward end of the housing 405 and extends forward from the housing. The cylinder has a piston (not shown) from which a piston rod 429 extends through its rod end to a threaded connection at 431 with the pin 425. The cylinder 427 has a port 433 at its rod end and a port 435 at its other or head end. By venting the cylinder via port 435 and admitting air under pressure into the rod end of the cylinder via port 433, the block 419 may be pulled forward to the retracted position illustrated in Fig. 16. By venting the cylinder via port 433 and admitting air under pressure into the cylinder via port 435, the block may be pushed to an extended position projecting out of the left end of the housing 405 as viewed in Fig. 16.

Figures 16, 17, 18, 19:
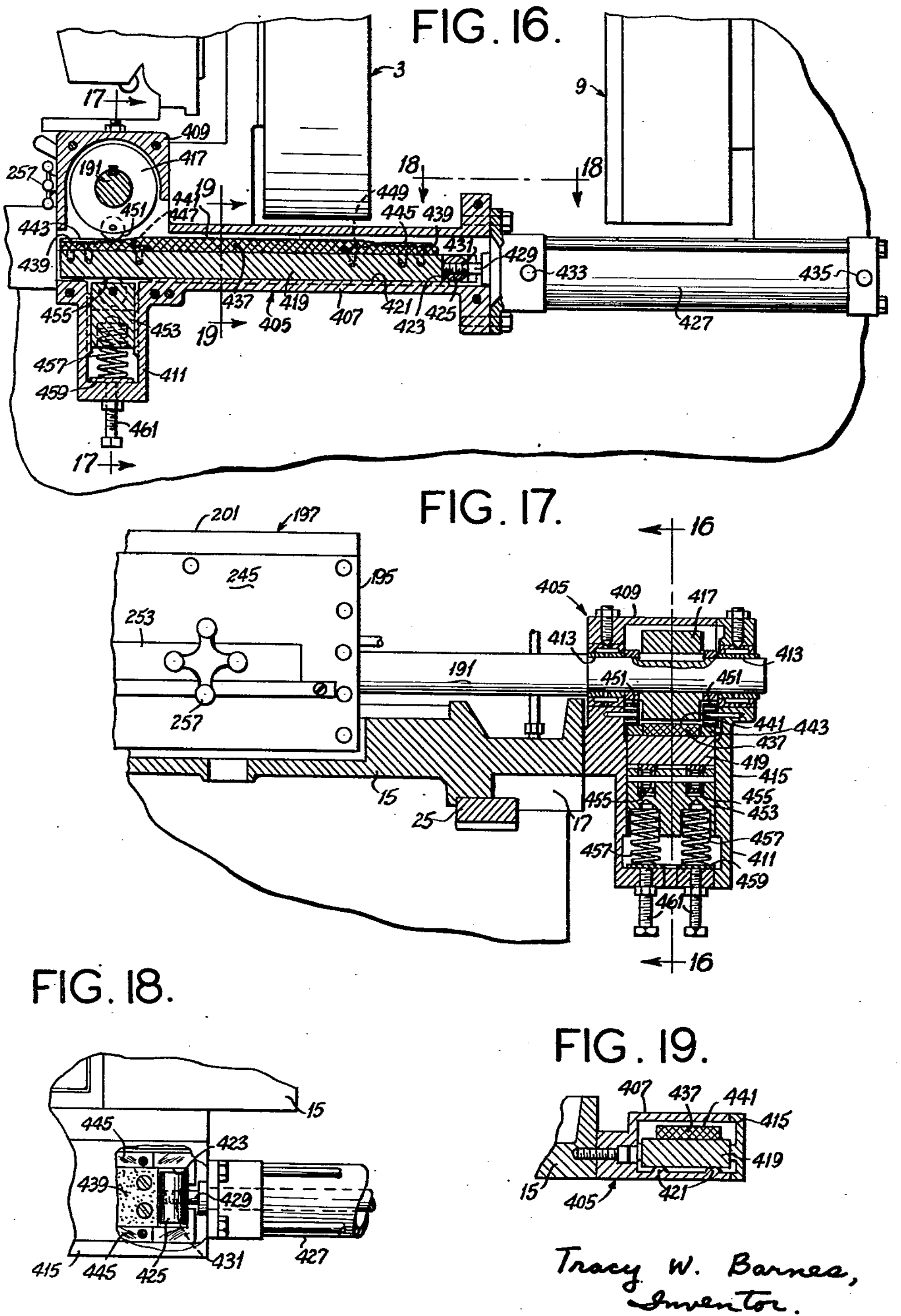
Fig. 16 is an enlarged view taken on line 16—16 of Fig. 3, with parts broken away and shown in section on line 16—16 of Fig. 17.
Fig. 17 is a section taken on line 17—17 of Fig. 16.
Fig. 18 is a view taken on line 18—18 of Fig. 16, with parts broken away and shown in section.
Fig. 19 is a section taken on line 19—19 of Fig. 16.

Fastened on the top of the block 419 is a pad 437 of friction material which is relieved at its ends as indicated at 439 and thereby presents a relatively long raised upper face 441 for engaging the friction wheel 417. Flanking the pad 437 at the leading (left) end of the block 419 as viewed in Fig. 16 is a pair of leading roller runners 443 and flanking the pad at the trailing (right) end of the block is a pair of trailing roller runners 445. The leading roller runners are relieved at their leading ends as indicated at 447, and the trailing roller runners are relieved at their trailing ends as indicated at 449. The pad projects above the runners. The upper surfaces of the runners are engageable by a pair of rollers 451 carried by the housing 405 and its cover 415 alongside the friction wheel (see Figs. 16 and 17). The leading end of the block 419 is biased upward toward the friction wheel by means of a roller block 453 vertically slidable in chamber 411 carrying a pair of rollers 455 engaging the bottom of the block 419 and biased upward by a pair of coil compression springs 457 reacting from a spring adjusting plate 459 at the bottom of chamber 411. Adjustment of the plate 459 for adjustment of the compression of springs 457 is effected by adjusting screws 461 threaded in the bottom of chamber 411.

The above-described arrangement is such that when the block 419 is in its retracted position of Fig. 16, its leading end is held down by engagement of the rollers 451 with the leading roller runners 443 and the friction wheel 417 is clear of the pad 437 and free to rotate. Upon operation of the cylinder 427 to drive the block 419 out of housing 405, the face 441 of pad 437 comes into engagement with the wheel and drives the wheel clockwise as viewed in Fig. 16. This rotates shaft 191 clockwise as viewed in Fig. 16 and counterclockwise as viewed in Fig. 2 and effects rotation of the scroll ring in such direction as to cause retraction of the chasers. When the block reaches its advanced position, the trailing roller runners 445 come into engagement with the rollers 451, whereupon the trailing end of the block is cammed downward away from the friction wheel and the latter is cleared from the pad 437.

Figure 24:
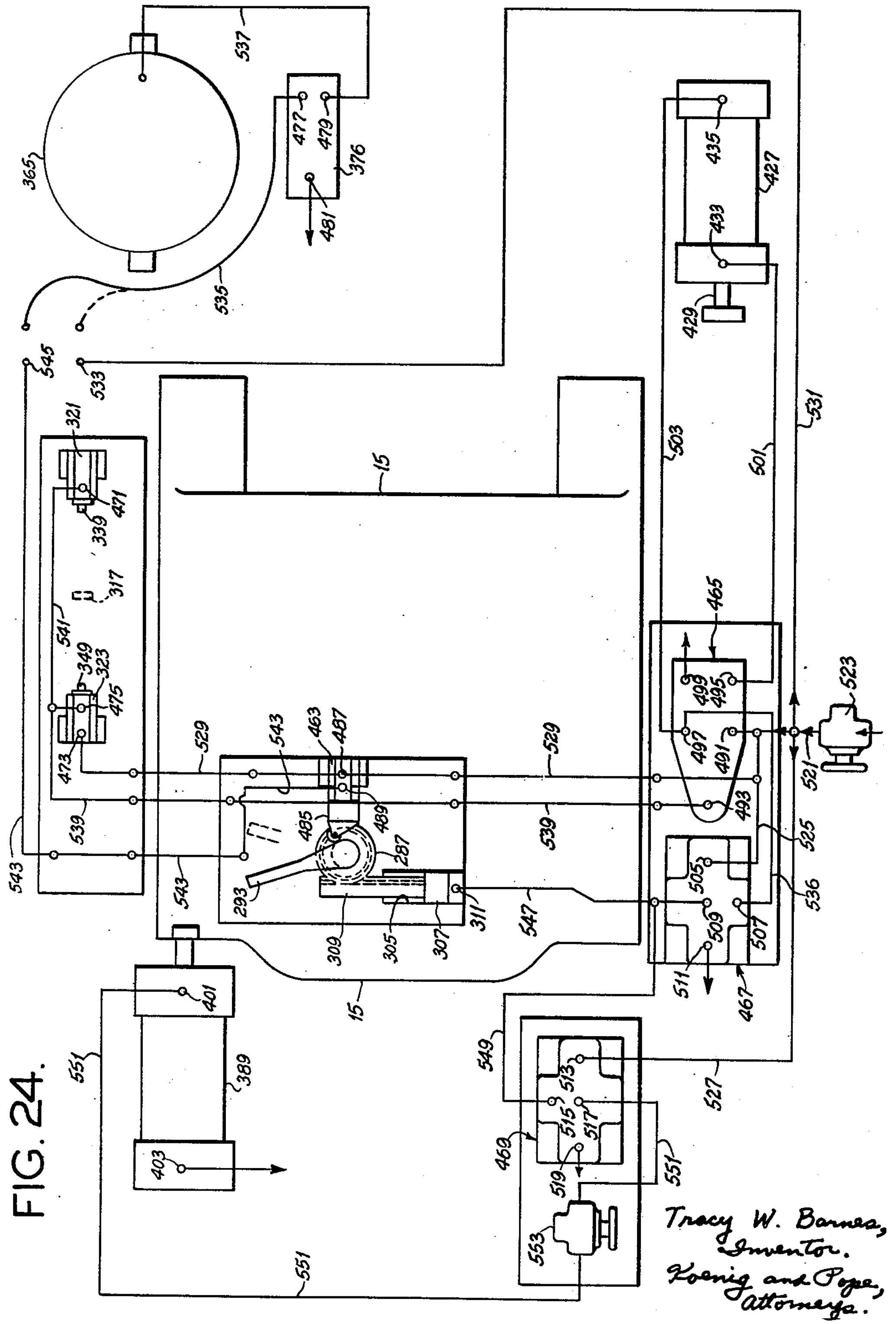
Fig. 24 is a fluid pressure system diagram.

Referring now to Fig. 24, the split nut control cylinder 305, the air pressure device 365 for the bed clamp 361, the carriage return cylinder 389 and the quick-opening cylinder 427 are shown to be connected in an air pressure system including the previously mentioned valves 321, 323 and 376, and also including a valve 463 carried by the carriage 15 and controlled by the lever 293, a master valve 465, a first time delay or sequence valve 467 and a second time delay or sequence valve 469. Valves 465, 467 are carried by the carriage 15. Valve 469 is on the bed.

The valve 321 is a pilot vent valve having a valve member operable by its push button 339 to vent a valve port 471 to atmosphere.

The stop valve 323 is a pilot valve having a valve member operable by its push button 349 to allow flow of air from a valve inlet 473 to a valve outlet 475. Normally the inlet is blocked from the outlet.

The manually operated valve 376 has an inlet port 477, a transfer port 479 and an exhaust port 481. Normally, the exhaust port is blocked and air may flow from the inlet port to the transfer port. The valve has an operating lever 483, which, when pushed down, vents the transfer port via the exhaust port, blocking the inlet port.

The lever-controlled valve 463 is a three-way pilot valve having a valve member 485 movable by the lever to an active position for flow of air from a valve inlet 487 to a valve outlet 489. In the inactive position of the valve member, the inlet 487 is blocked from the outlet 489, and the outlet 489 is vented. This valve is opened when the lever 293 is swung to engage the half-nuts 273 with the lead screw 23, being closed when the lever is in disengaged position.

The master valve 465 is a four-way air-controlled valve of a type having a control cylinder and a valve operating member normally held in an inactive position by a spring acting on a piston therein. It has an inlet 491 and also has a control port 493 through which air may be introduced to act on the piston against the spring to set the valve in active position. It further has first and second transfer ports 495 and 497, and an exhaust port 499. In the inactive position of the valve, air from the air inlet 491 is supplied to the transfer port 495, and port 497 is vented via the exhaust port 499. In the active position of the valve, air from the air inlet 491 is supplied to the port 497, and port 495 is vented via the exhaust port 499. A line 501 connects port 495 and the port 433 of quick-return cylinder 427. A line 503 connects port 497 and the port 435 of cylinder 427. Thus, when the valve 465 is in inactive position, the rod end of cylinder 427 is supplied with air via port 495 and line 501 and its head end is vented via line 503 and ports 497 and 499 so that the block 419 is retracted. When the valve 564 is in active position, the rod end of cylinder 427 is vented via line 501 and ports 495 and 499 and its head end is supplied with air via port 497 and line 503 to drive block 419 to its extended position.

The first time delay or sequence valve 467 is a pilot-operated type of valve having an air inlet 505, a control port 507, a transfer port 509, an exhaust port 511 and valve mechanism which acts upon supply of air to the control port to block the exhaust port and to supply air from the inlet to the transfer port a predetermined time interval after introduction of air under pressure to the control port. In the absence of pressure in the control port, the transfer port is vented through the exhaust port.

The second time delay or sequence valve 469 is identical to valve 467, having an air inlet 513, a control port 515, a transfer port 517 and an exhaust port 519.

Details of the valves are not herein disclosed as suitable valves for the purposes described are well known and commercially available. For example, valves 321 and 323 may be PCB–22 pilot valves manufactured by the Ross Operating Valve Company of Detroit, Michigan. Valve 463 may be this company's PCB–65 pilot valve. The master valve 465 may be this company's MV–101–M2 valve. The valves 467 and 469 may be this company's ST–100 time delay valve. Reference is made to this company's catalog No. 5, for example.

At 521 is shown the main air supply line including a speed control valve 523, such as a Ross Operating Valve Company's A–516 valve. This line is connected to the inlet 491 of the master valve 465 and has a branch 525 leading to the inlet 505 of time delay valve 467, a branch 527 leading to the inlet 513 of time delay valve 469, a branch 529 leading to the inlet 487 of the lever-controlled valve 463 and to the inlet 473 of stop valve 323, and a branch 531 leading to a coupling indicated at 533 for connection, if desired, to a line 535 leading to the inlet 477 of manually operable clamp control valve 376. A line 537 leads from the transfer port 479 of valve 376 to the clamp-operating air pressure device 365. The outlet 475 of the stop valve 323 is connected by a line 539 to the control port 493 of the master valve 465 and by a line 541 to the port 471 of valve 321. A line 543 leads from the outlet 489 of the lever-controlled valve 463 to a coupling 545 for connection to the line 535. A line 536 connects port 497 of master valve 465 to control port 507 of valve 467. The transfer port 509 of valve 467 is connected by a line 547 to the inlet 311 of the split-nut control cylinder 305, and by a line 549 to the control port 515 of valve 469. The transfer port 517 of valve 469 is connected by a line 551 including a speed control valve 553 of the same type as valve 523 to the transfer port 401 of carriage return cylinder 389.

Referring to Figs. 11 and 15, threading dial 555 is provided to assure correct timing of engagement of the half-nuts 273 with the lead screw 23 when a thread is cut in multiple passes, i. e., one or more roughing passes and a finishing pass, so that when the finishing pass is made the chasers will follow the original cut. This dial is fixed on the upper end of a vertical shaft 557 rotary in a bearing 559 mounted on the carriage 15. Fixed on the lower end of this shaft below the carriage in rolling engagement with the lead screw 23 is a pinion 561. The dial 555 has eight marks at 45° intervals (Fig. 11). Four of the marks at 90° intervals are numbered 1, 2, 3 and 4, the remainder not being numbered. As the carriage 15 travels on the bed, the dial turns due to the rolling engagement of the pinion 561 with the lead screw.

Operation is as follows:

It will be understood that the variables involved in cutting a thread on a pipe are the size of the pipe, the thread length, the thread pitch, the thread taper, and the thread form. The requirement as to thread form is taken care of by the form of the serrations on the cutting face of the chaser. For cutting different thread forms, different chasers are used. The requirements as to thread length and size of pipe are wholly taken care of by the apparatus, as will be made clear. The requirements as to pitch and thread taper are taken care of in part by adjustment of the apparatus and in part by use of different chasers.

Assuming that it is desired to cut in one pass a thread of a given form, pitch, taper and length on a pipe of given outside diameter, the pipe is chucked in the headstock in such manner as to project from the inboard chuck 9 toward the die head 3. In working on a short pipe only the inboard chuck 9 is used. For longer work, both the inboard chuck 9 and outboard chuck 11 are used. The length of pipe projecting from the face of the chuck 9 will depend upon whether the end of the pipe has been previously prepared for threading. If the pipe has not been previously prepared, the mechanism 89 is used to cut off, bevel and ream the end of the pipe in preparation for threading, this being standard practice.

With appropriate chasers as related to the desired thread form, thread pitch and thread taper in place in the die head, and with screws 133 adjusted to insure equal distribution of cut of the chasers, the apparatus is set up for the proper speed ratio between the connecting shaft 41 and the lead screw as related to the pitch of the thread to be cut by placement of the proper change gear at 73 on the end of the lead screw 23 in the housing 35. To change gears at 73, the nut 79 is released, allowing the sector plate 69 to be swung to disengage gears 71 and 73. Then after the change gear is fixed on the end of the lead screw, the sector plate is swung back to re-engage gears 71 and 73, and locked in position by tightening the nut 79. A gear chart may be supplied for information as to the change gears needed for the desired thread pitch.

The apparatus is set up for the proper speed ratio between the rate of travel of the carriage 15 and the rate of rotation of the scroll ring 95 as related to the taper of the thread to be cut by shifting the cluster 227 in the selector gear box 197 to obtain meshing of that gear set which will derive the rate of outward movement of the chasers consistent with the desired taper. It will be understood that the greater the taper, the greater must be the ratio of the rate of outward movement to the speed of the carriage.

The apparatus is set up for the size of pipe to be threaded by pulling out the knob 217 to slide the sleeve 211 and the pinion 187 to the left as viewed in Fig. 4, thereby to disengage the pinion from the rack 189. Then the handwheel 223 is manually turned to rotate the scroll ring 95 and move the chasers in or out, as required, until the graduation G corresponding to the pipe size is visible in the window 186 and in register with the index mark I.

The apparatus is set up for thread length by loosening the screws 337 and 347 (Figs. 20 and 21) to allow longitudinal adjustment of the adjusting plates 333 and 343 and the valves 321 and 323 carried by these plates. The stop rod 357 is pushed in to push the rack 189 relative to the carriage 15 to the position wherein the pointer 325 on the trip 317 aligns with the desired thread length graduation on the thread length scale 327. This is accomplished while the pinion 187 is disengaged from the rack, allowing for motion of the rack independently of the pinion. Then the pinion 187 is re-engaged with the rack by pushing in the knob 217. In case this results in a slight movement of the rack and the pointer one way or the other, due to the necessity of obtaining meshing of the pinion and rack teeth, the pointer is adjusted relative to the rack to bring it back into registry with the desired thread length graduation on the scale 327.

The stop valve 323 is then adjusted longitudinally until its push button 349 engages the rearward side of the trip 317, and screws 347 are tightened to hold this valve in adjusted position. Then by turning the handwheel 31 the carriage 15 is moved manually to the right as viewed in Figs. 1, 2, 20 and 21 to the point where the pointer 325 is in register with the zero mark to the left of the left end of the thread length scale 327. It will be understood that the half-nuts 273 are at this time disengaged from the lead screw 23. Upon movement of the carriage to the right to bring it to the zero position, the stop valve 323 moves away from the trip 317 a distance equal to the desired thread length plus pre-travel for chaser throat action. During this movement the carriage the rack 189 is held against movement to the right by its engagement with the head 383 on the forward end of the stop rod 379 and the engagement of the outer end of this stop rod with the clamp 384. The pinion 187 rolls on the rack in such direction as to move the chasers inward to proper position for starting the cutting of the taper thread on the particular size of pipe.

The rack-adjusting sleeve 351 is then turned by knob 353 until the inner end of the sleeve has moved the head 359 on the end of stop rod 357 into engagement with the end of the rack 189. Then the reset valve 321 is adjusted until its push button 339 engages the trip 317. Screws 337 are then tightened to hold the valve in adjusted position. The cut-adjusting head 380 on clamp 361 is positioned with its finish-cut step **380*a* located for engagement with the end of stop rod 357, and the nut 377 (Fig. 21) is then adjusted to close the gap between the step 380*a* and the forward end of the stop rod 357. Fine size adjustment is made by screwing sleeve 351 in or out, and locking it in position by set screw 352**.

The above set-up for thread length results in positioning of the parts illustrated in Figs. 1, 2, 20 and 21. It will be seen that as a result of the set-up, the push buttons 339 and 349 of valves 321 and 323 are longitudinally spaced a distance equal to the desired thread length plus the pre-travel distance plus the width of the trip 317, and that the trip is engaged with the button 339 of the valve 321 (Figs. 20 and 21). The line 535 is coupled at 545 to line 543.

To cut a thread on the pipe, the pipe is chucked in the headstock and, if not previously prepared for threading, is cut off, beveled and reamed by mechanism 89. After this operation, the carriage is manually moved to the extreme right until the stop rod 379 engages the clamp 384. This sets the chasers in starting position.

Then the carriage is manually moved to the left until the edges of the throats of the chasers are in line with the end of the pipe. As the carriage is moved to the left, the rack 189 moves along with it, so that there is no relative motion as between the rack and the pinion 187. This is because the bed clamp 361 is loose on the bed and is simply pushed to the left as the carriage is moved to the left. Thus, there is nothing to impede the motion of the rack to the left along with the carriage. The trip 317 on the rack remains in engagement with the push button 339 of the reset valve 321, and the pointer 325 remains on the zero mark on the thread length scale.

Now the operator throws the half-nut shifting lever 293 to engage the half-nuts with the lead screw, which is rotating in such direction that the carriage is thereupon driven forward toward the headstock at the proper speed determined by the change gear at 73. As soon as the lever 293 is swung to the closed position, the valve 463 is actuated to supply air from the supply line 529, to the line 543 and thence via line 535, valve 376 and line 537 to the clamp operating motor 365. This immediately effects locking of the bed clamp 361 to the bed, so that the rack 189 is held against forward movement. Then, as the carriage moves forward, the pinion 187 rolls on the rack and rotates counterclockwise as viewed in Figs. 2 and 20. The pin 224 on the pinion engages the dog 226 on collar 225 to rotate sleeve 211 and shaft 191 counterclockwise. This effects rotation of the scroll ring 95 in such direction and at such a rate (dependent upon the setting of cluster 227) as to cause a receding action of the chasers at a rate so related to their forward movement toward the headstock that they cut a taper thread on the end of the pipe with the desired taper. Also, the rate of forward movement of the chasers toward the headstock is so related to the speed of rotation of the pipe that the thread is cut with the desired pitch.

When the carriage has traveled toward the headstock a distance equal to the pre-set thread length, the push button 349 of the stop valve 323 engages the trip 317 on the rack 189 and the valve 323 is opened to allow flow of air from its inlet 473 to its outlet 475. Thereupon air under pressure is supplied from supply line 529 through the valve to lines 539 and 541. Line 539 delivers air to the master valve 465 through the control port 493. This acts on the control cylinder of the master valve to set this valve in its active position to supply air from the master valve inlet 491 through ports 497 to lines 503 and 536, and to vent line 501 via ports 495 and 499. With pressure in line 503 and with line 501 vented, the piston rod 429 of quick-opening cylinder 427 is driven to the left as viewed in Fig. 16 to drive the block 419 to its extended position, thereby rotating friction wheel 417 and shaft 191 to effect quick retraction of the chasers outward from the pipe. This occurs immediately when the desired length of thread has been cut. In this respect, it will be observed that as the block 419 is driven to its extended position, it rotates shaft 191, sleeve 211 and collar 225 counterclockwise is viewed in Figs. 2 and 20 without rotation of pinion 187, the dog 226 rotating counterclockwise away from the left side of pin 224 on the pinion as illustrated in Figs. 2 and 20 an arc determined by the stroke of the piston rod 429 (and the block 419). This is less than 360°, so that the dog does not come into engagement with the other side of the pin. Line 536 delivers air to the control port 507 of the first time delay valve 467. After a time delay, the valve 467 supplies air from its inlet 505 to its transfer port 509 and thence through the line 547 to the split-nut control cylinder 305 and through line 549 to the control port 515 of the second time delay valve 469. Air supplied to the cylinder 305 drives the piston 307 forward to disengage the half-nuts 273 from the lead screw, this being accompanied by swinging of the lever 293 from its closed to its open position, and by resetting of the valve 463. Upon this resetting of the valve 463, the air motor 365 is vented via 537, 479, 477, 535, 545, 543 and port 489 to release the grip of clamp 361 on the bed so that it may slide freely thereon.

At this stage of operation, the chasers occupy their open-die position wherein they are spaced outward from the pipe a distance equal to the sum of the amount of recession for taper effected by the rotation of the scroll ring and the amount of outward movement effected by operation of the quick-opening cylinder 427. The half-nuts 273 are disengaged from the lead screw. The bed clamp 361 is free to slide on the bed. Following the disengagement of the half-nuts from the lead screw, carriage 15 is automatically retracted away from the headstock by the operation of carriage-return cylinder 389. This occurs due to the delayed action of the second time delay valve 469 by air delivered to its control port 515 via line 549 to supply air from its inlet ports 513 to port 517 and thence via line 551 to the head end of cylinder 389. The delay imposed by valve 469 insures that cylinder 389 is not set into operation to retract the carriage before the half-nuts 273 are disengaged from the lead screw. Upon the automatic retraction of the carriage 15, the rack 189 moves with the carriage until stop rod 379 engages stop clamp 384, and then is held against movement to the right as viewed in Figs. 2, 20 and 21 while the carriage completes its return movement. Until the rack 189 stops, the pinion 187 does not rotate since it also moves with the carriage. Once the rack stops, the pinion 187 rolls thereon as the carriage completes its return movement, and rotates clockwise as viewed in Figs. 2 and 20 through such an arc that pin 224 comes into engagement with the other side of the dog 226 and drives the collar 225, sleeve 211 and shaft 191 clockwise, thereby driving the scroll ring 95 in reverse direction to effect inward movement of the chasers. The clockwise rotation of the shaft 191 due to this action is such as to move the chasers inward a distance equal to the previous outward recession for taper.

At the termination of the retraction of the carriage 15 by cylinder 389, the push button 339 of the reset valve 321 engages the trip 317 on the rack 189 and the valve 321 is opened to vent lines 541 and 539. This vents the control port 493 of the master valve 465, and the latter resets. This results in air being supplied to the rod end of cylinder 427 via port 495, line 501 and port 433, and in the head end of cylinder 427 being vented via port 435, line 503, port 497 and exhaust port 499. Accordingly, the piston rod 429 is pulled back into cylinder 427 and block 419 is pulled back into the housing 405. This causes rotation of the friction wheel 417 and shaft 191 counterclockwise as viewed in Fig. 16. This rotation of the shaft 191 is clockwise as viewed in Figs. 2 and 20. While the pinion 187 is locked against rotation, the dog 226 is free to move clockwise away from the pin 224 on the pinion. The stated clockwise rotation of shaft 191 effects an inward return movement of the chasers supplementing that previously caused by the return of the carriage, and corresponding to the amount of the previous quick-opening movement of the chasers, thereby returning the chasers to their initial position ready to start a cut on another pipe.

The resetting of the master valve 465 by the venting of its control port 493 also results in venting of line 536 via port 497 and exhaust port 499 of the master valve. This vents the control port 507 of the first time delay valve 467. This results in venting of line 547 via the valve transfer port 509 and exhaust port 511. This vents the half-nut control cylinder 305 so that lever 293 may be swung to its closed position. It also vents the line 549 to vent the control port 515 of the second time delay valve 469. This results in venting of the rod end of carriage-return cylinder 389 via line 551, port 517 and exhaust port 519.

Once the apparatus is set up to cut a given thread on a given size of pipe, threads may be cut successively on pipes of this size without requiring any further setting or adjustment of the apparatus between successive cuts. After any one pipe has been threaded, it is necessary only to take this pipe out of the headstock, chuck the next pipe in the headstock, and repeat the operations as above described. This is possible because threading may be started at any location of the end of the pipe without requiring any change in the initial set-up of the apparatus. With the bed clamp 361 loose on the bed, the carriage 15 may be moved to any position on the bed forward of its retracted position as determined by the stop clamp 384 without rotating the pinion 187 and without changing the relative position of the trip 317 on the rack with respect to the stop valve 323.

It is to be noted that in cutting a thread on a pipe in one pass as above described, the line 535 is coupled at 545 to the line 543. To cut a thread on a pipe in a roughing pass and a finish pass, the line 535 is uncoupled from 545 and coupled at 533 to line 531. This takes the air motor 365 off automatic control and the clamp 361 remains locked to the bed unless valve 376 is opened by pushing down lever 483. The nut 377 on the end of rod 375 is removed. In setting up for cutting in two passes, the procedure is generally the same as previously described up to the stage where the carriage 15 is manually moved to the left until the edges of the throats of the chasers are in line with the end of the pipe. In order to move the carriage manually to the left, the lever 483 is held down to vent the air motor 365 via line 537 and ports 479 and 481 of valve 376, so that the clamp 361 is free to slide on the bed. The cut-adjusting head 380 is positioned with finish-cut step 380*a* located for engagement with the end of stop rod 357. When the carriage has been moved to the left to the point where the edges of the throats of the chasers are in line with the end of the pipe, the lever 483 is released to cause the clamp 361 to become locked to the bed. The carriage is then retracted, and head 380 is rotated to locate one or the other of rough-cut steps 380*b* or 380*c*, depending on the taper of the thread to be cut, in position for engagement with the end of stop rod 387. The operator then manually moves the carriage to the left until the end of rod 357 engages step 380*b* or 380*c*, as the case may be, and then throws lever 293 to engage the half-nuts 273 with the lead screw and take a roughing pass, the operation being the same as previously described for cutting in one pass, the carriage 15 being automatically returned to retracted position after completion of the roughing pass. The operator then rotates head 380 to locate the finish-cut step 380*a* for engagement with the end of stop rod 357, manually moves the carriage to the left until the end of the rod engages step 380*a*, and again throws lever 283 to take the finish cut. Instead of using the three-step rotary head 380, replaceable heads of different depths may be used to obtain the various cutting positions.

When cutting a thread in multiple passes, the threading dial 555 is utilized to assure the correct timing in engagement of the half-nuts 273 on the lead screw 23 so that, in making the successive passes, the chasers will follow the initial pass. In cutting even threads (8, 10, 12, etc.), the half-nuts may be closed at any numbered line on the dial. In cutting half numbered threads (8½, 10½, 11½, etc.) the half-nuts may be closed at any one-half revolution such as 1 and 3, 2 and 4, etc. In cutting quarter threads (7¼, 8¼, 9¼, etc.), the half nuts must be closed at the same line on the dial.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Thread cutting apparatus comprising a bed, means on the bed for holding and rotating work to be threaded, a carriage movable on the bed toward and away from said means, a die head on the carriage having chasers mounted for inward and outward movement relative to the work, chaser opening mechanism including fluid pressure means associated with the die head for retracting the chasers from the work at the termination of a thread cutting operation, a lead screw extending longitudinally of the bed, a nut carried by the carriage releasably engageable with the lead screw, fluid pressure means carried by the carriage for disengaging the nut from the lead screw, a trip adjustably positioned relative to the bed, and a valve carried by the carriage and operable by the trip upon movement of the carriage through a predetermined distance, both said fluid pressure means being in a fluid pressure system controlled by the valve adapted successively to effect operation of the first fluid pressure means to retract the chasers from the work and then to effect operation of the second fluid pressure means to disengage the nut from the lead screw, the trip being carried by and movable longitudinally relative to the carriage, and a stop means mounted on the bed and shiftable to different positions longitudinally of the bed for holding the trip against movement while the carriage moves.

2. Thread cutting apparatus as set forth in claim 1 wherein the stop means comprises a clamp which may be clamped to the bed to hold it fixed on the bed and which may be released for shifting on the bed.

3. Thread cutting apparatus comprising a bed, means on the bed for holding and rotating work to be threaded, a carriage movable on the bed toward and away from said means, a die head on the carriage having chasers mounted for inward and outward movement relative to the work, means for moving the chasers in and out including a train of gears carried by and movable with the carriage and having a pinion engageable with a rack extending longitudinally of the bed, the pinion being adapted to roll on the rack to drive the train of gears to effect movement of the chasers to cut a taper thread, the rack being adjustable to different positions longitudinally of the bed, a lead screw extending longitudinally of the bed, a nut carried by the carriage releasably engageable with the lead screw, chaser opening means associated with the die head for retracting the chasers from the work when a predetermined length of thread has been cut, means carried by the carriage for disengaging the nut from the lead screw, a trip on the rack, and means including a control carried by the carriage engageable with the trip for effecting operation of the chaser opening means and the nut-disengaging means.

4. Thread cutting apparatus as set forth in claim 3 wherein the rack is carried by and movable longitudinally relative to the carriage, and wherein there is provided a stop means mounted on the bed and shiftable to different positions longitudinally of the bed for holding the rack against movement while the carriage moves.

5. Thread cutting apparatus as set forth in claim 3 wherein the pinion is movable into and out of engagement with the rack.

6. Thread cutting apparatus comprising a bed, means on the bed for holding and rotating work to be threaded, a carriage movable on the bed toward and away from said means, a die head on the carriage having chasers mounted for inward and outward movement relative to the work, means for moving the chasers in and out including a train of gears carried by and movable with the carriage and having a pinion engageable with a rack extending longitudinally of the bed, the pinion being adapted to roll on the rack to drive the train of gears to effect movement of the chasers to cut a taper thread, the rack being adjustable to different positions longitudinally of the bed, a lead screw extending longitudinally of the bed, a nut carried by the carriage releasably engageable with the lead screw, chaser opening mechanism including fluid pressure means associated with the die head for retracting the chasers from the work when a predetermined length of thread has been cut, fluid pressure means carried by the carriage for disengaging the nut from the lead screw, a trip on the rack, both said fluid pressure means being in a fluid pressure system including a valve carried by the carriage engageable with the trip for successively effecting operation of the first and then the second fluid pressure means.

7. Thread cutting apparatus as set forth in claim 6 wherein the rack is carried by and movable longitudinally relative to the carriage, and wherein there is provided a fluid-pressure-controlled clamp shiftable to different positions on the bed and adapted to be clamped by fluid pressure at different positions on the bed for holding the rack against movement while the carriage moves, said clamp being connected in said fluid pressure system under control of a valve operable to supply pressure to the clamp when the nut is engaged with the lead screw and to vent the clamp when the nut is disengaged from the lead screw.

8. Thread cutting apparatus comprising a bed, means on the bed for holding and rotating work to be threaded, a carriage movable on the bed forward and rearward toward and away from said means, a die head on the carriage having chasers mounted for inward and outward movement relative to the work, means for moving the chasers in and out including a train of gears carried by and movable with the carriage and having a pinion engageable with a rack extending longitudinally of the bed, the pinion being adapted to roll on the rack to drive the train of gears to effect movement of the chasers to cut a taper thread, the rack being carried by and movable longitudinally relative to the carriage, a fluid-pressure-controlled clamp shiftable to different positions on the bed and adapted to be clamped by fluid pressure at different positions on the bed for holding the rack against movement while the carriage moves forward, a lead screw extending longitudinally of the bed, a nut carried by the carriage releasably engageable wtih the lead screw, means carried by the carriage for manually engaging the nut with the lead screw, fluid pressure means carried by the carriage for disengaging the nut from the lead screw, chaser opening mechanism including fluid pressure chaser opening means associated with the die head for retracting the chasers from the work when a predetermined length of thread has been cut, a trip on the rack, a stop valve carried by the carriage rearward of the trip, a reset valve carried by the carriage forward of the trip, said valves being longitudinally adjustable relative to one another on the carriage to vary the distance therebetween to correspond to a desired thread length, said valves being connected in a fluid pressure system including the clamp, the nut-disengaging means, and the chaser opening means, said system further including a valve operable by the nut-engaging means to supply pressure to the clamp when the nut is engaged with the lead screw and to vent the clamp when the nut is disengaged from the lead screw, said stop valve upon engagement with the trip acting to effect successive operation of the chaser opening means and then the nut-disengaging means, said reset valve upon engagement with the trip acting to effect venting of the chaser opening means and the nut-disengaging means to allow resetting thereof.

9. Thread cutting apparatus comprising a bed, means on the bed for holding and rotating work to be threaded, a carriage movable on the bed toward and away from said means, a die head carried by the carriage having chasers mounted for inward and outward movement relative to the work, chaser opening mechanism associated with the die head for retracting the chasers from the work, means for actuating the chaser opening mechanism at the termination of a thread cutting operation including a thread length control having cooperating control elements, one of which is carried by the carriage and adapted for adjustment to different positions longitudinally of the carriage, and the other of which is movable with and longitudinally relative to the carriage, and means shiftable to different positions on the bed and adapted to hold said other element against movement as the carriage moves.

10. Thread cutting apparatus comprising a bed, means on the bed for holding and rotating work to be threaded, a carriage movable on the bed toward and away from said means, a die head carried by the carriage, a power drive for moving the carriage toward said work holding and rotating means, and means for automatically terminating the operation of said drive at the termination of a thread cutting operation including a thread length control having cooperating control elements, one of which is carried by the carriage and adapted for adjustment to different positions longitudinally of the carriage, and the other of which is movable with and longitudinally relative to the carriage, and means shiftable to different positions on the bed and adapted to hold said other element against movement as the carriage moves.

11. Thread cutting apparatus comprising a bed, means on the bed for holding and rotating work to be threaded, a carriage movable on the bed toward and away from said means, a die head carried by the carriage, a lead screw extending longitudinally of the bed, a nut carried by the carriage releasably engageable with the screw, and means for automatically disengaging the nut from the screw at the termination of a thread cutting operation including a thread length control having cooperating control elements, one of which is carried by the carriage and adapted for adjustment to different positions longitudinally of the carriage, and the other of which is movable with and longitudinally relative to the carriage, and means shiftable to different positions on the bed and adapted to hold said other element against movement as the carriage moves.

12. Thread cutting apparatus comprising a bed, means on the bed for holding and rotating work to be threaded, a carriage movable on the bed toward and away from said means, a die head on the carriage having chasers mounted for inward and outward movement relative to the work, and means for moving the chasers in and out comprising a train of gears carried by the carriage and movable therewith, a rack extending longitudinally of the bed, a pinion carried by the carriage engageable with the rack, a lost-motion connection between the pinion and said train of gears, the pinion being adapted to roll on the rack upon movement of the carriage in thread-cutting direction and acting through said lost-motion connection when the lost motion therein is taken up to drive the train of gears to effect movement of the chasers to cut a taper thread, and a drive for the train of gears carried by the carriage and operable independently of said pinion and rack to drive the train to the extent permitted by said lost-motion connection at the termination of a thread cutting operation for effecting quick retraction of the chasers from the work.

13. Thread cutting apparatus comprising a bed, means on the bed for holding and rotating work to be threaded, a carriage movable on the bed toward and away from said means, a die head on the carriage having chasers mounted for inward and outward movement relative to the work, a shaft carried by the carriage and extending transversely of the carriage, a train of gears carried by the carriage driven by the shaft, and means driven by the train of gears for moving the chasers in and out, a pinion rotary on the shaft, a lost-motion connection between the pinion and the shaft, a rack extending longitudinally of the bed engageable by the pinion, the pinion being adapted to roll on the rack upon movement of the carriage in thread-cutting direction and acting through said lost-motion connection when the lost motion therein is taken up to drive the train of gears to effect movement of the chasers to cut a taper thread, a drive for the shaft carried by the carriage and operable independently of the pinion to drive the shaft to the extent permitted by the lost-motion connection at the termination of a thread cutting operation for effecting quick retraction of the chasers from the work.

14. Thread cutting apparatus as set forth in claim 13 wherein said drive for the shaft is a friction drive.

15. Thread cutting apparatus as set forth in claim 13 wherein the rack is carried by and movable longitudinally relative to the carriage, and wherein there is provided a stop means mounted on the bed and shiftable to different positions longitudinally of the bed for holding the rack against movement while the carriage moves.

16. Thread cutting apparatus as set forth in claim 13 wherein the pinion is slidable on the shaft into and out of engagement with the rack.

17. Thread cutting apparatus as set forth in claim 13 wherein said drive for the shaft comprises a friction wheel on the shaft, a friction rack for driving the wheel, and fluid pressure means for reciprocating the friction rack.

18. Thread cutting apparatus as set forth in claim 17 further comprising means whereby the friction rack is freed from engagement with the friction wheel at the ends of its stroke.

19. Thread cutting apparatus comprising a bed, means on the bed for holding and rotating work to be threaded, a carriage movable on the bed toward and away from said means, a die head carried by the carriage having chasers mounted for inward and outward movement relative to the work, a first power drive for moving the carriage toward said means, a second power drive for moving the carriage away from said means, chaser opening mechanism associated with the die head for retracting the chasers from the work, and means for automatically actuating the chaser opening mechanism, terminating the operation of the first power drive and initiating operation of the second power drive at the termination of a thread cutting operation including a thread length control having cooperating control elements, one of which is carried by the carriage and adapted for adjustment to different positions longitudinally of the carriage, and the other of which is movable with and longitudinally relative to the carriage, and means shiftable to different positions on the bed and adapted to hold said other element against movement as the carriage moves.

20. Thread cutting apparatus comprising a bed, means on the bed for holding and rotating work to be threaded, a carriage movable on the bed toward and away from said means, a die head on the carriage having chasers mounted for inward and outward movement relative to the work, chaser opening mechanism including fluid pressure means associated with the die head for retracting the chasers from the work at the termination of a thread cutting operation, a lead screw extending longitudinally of the bed, a nut carried by the carriage releasably engageable with the lead screw, fluid pressure means carried by the carriage for disengaging the nut from the lead screw, fluid pressure means for moving the carriage away from the work holding means when the nut is disengaged from the lead screw, a trip adjustably positioned relative to the bed, and a valve carried by the carriage and operable by the trip upon movement of the carriage through a predetermined distance, said three fluid pressure means being in a fluid pressure system controlled by the valve adapted successively to effect operation of the first fluid pressure means to retract the chasers from the work and then to effect operation of the second fluid pressure means to disengage the nut from the lead screw and then to effect operation of the third fluid pressure means to return the carriage to a retracted position, the trip being carried by and movable longitudinally relative to the carriage, and a stop means mounted on the bed and shiftable to different positions longitudinally of the bed for holding the trip against movement while the carriage moves.

21. Thread cutting apparatus as set forth in claim 20 wherein the stop means comprises a clamp which may be clamped to the bed to hold it fixed on the bed and which may be released for shifting on the bed, and wherein the clamp carries a cut-adjusting head having rough-cut and finish-cut steps, said head being adjustable on the clamp for positioning the different steps for holding the trip.

22. Thread cutting apparatus comprising a bed, means on the bed for holding and rotating work to be threaded, a carriage movable on the bed toward and away from said means, a die head on the carriage having chasers mounted for inward and outward movement relative to the work, means for moving the chasers in and out including a train of gears carried by and movable with the carriage, a rack extending longitudinally of the bed and adjustable to different positions longitudinally of the bed, a pinion carried by the carriage engageable with the rack, a lost-motion connection between the pinion and said train of gears, the pinion being adapted to roll on the rack upon movement of the carriage in thread-cutting direction and acting through said lost-motion connection when the lost motion therein is taken up to drive the train of gears to effect movement of the chasers to cut a taper thread, a drive for the train of gears carried by the carriage and operable independently of the pinion and rack to drive the train to the extent permitted by said lost-motion connection at the termination of a thread cutting operation for effecting quick retraction of the chasers from the work, a lead screw extending longitudinally of the bed, a nut carried by the carriage releasably engageable with the lead screw, means carried by the carriage for disengaging the nut from the lead screw, means for moving the carriage away from the work holding means to return it to a retracted position when the nut is disengaged from the lead screw, a trip on the rack, and means including a control carried by the carriage engageable with the trip for effecting successive operation of the said gear train drive, the nut-disengaging means, and the carriage-return means.

23. Thread cutting apparatus comprising a bead, means on the bed for holding and rotating work to be threaded, a carriage movable on the bed toward and away from said means, a die head on the carriage having chasers mounted for inward and outward movement relative to the work, a shaft carried by the carriage and extending transversely of the carriage, a pinion rotary on the shaft, a lost-motion connection between the pinion and the shaft, a rack extending longitudinally of the bed engageable by the pinion, a train of gears carried by the carriage driven by the shaft, means driven by the train for moving the chasers in and out, the pinion being adapted to roll on the rack upon movement of the carriage in thread-cutting direction and acting through said lost-motion connection when the lost motion therein is taken up to drive the train of gears to effect movement of the chasers to cut a taper thread, fluid pressure means carried by the carriage for driving the shaft and operable independently of the pinion to drive the shaft to the extent permitted by the lost-motion connection at the termination of a thread cutting operation for effecting quick retraction of the chasers from the work, the rack being adjustable to different positions longitudinally of the bed, a lead screw extending longitudinally of the bed, a nut carried by the carriage releasably engageable with the lead screw, fluid pressure means carried by the carriage for disengaging the nut from the lead screw, fluid pressure means for moving the carriage away from the work holding means to return it to a retracted position when the nut is disengaged from the lead screw, a trip on the rack, said three fluid pressure means being in a fluid pressure system including a valve carried by the carriage engageable with the trip for successively effecting operation of the first, second and third fluid pressure means.

24. Thread cutting apparatus as set forth in claim 23 wherein the successive operation of the fluid pressure means is obtained by means of two time delay valves in the system, the first of which delays operation of the second fluid pressure means until after the operation of the first fluid pressure means, and the second of which delays operation of the third fluid pressure means until after the operation of the second fluid pressure means.

25. Thread cutting apparatus as set forth in claim 23 wherein the rack is carried by and movable longitudinally relative to the carriage, and wherein there is provided a fluid-pressure-controlled clamp shiftable to different positions on the bed and adapted to be clamped by fluid pressure at different positions on the bed for holding the rack against movement while the carriage moves, said clamp being connected in said fluid pressure system under control of a valve operable to supply pressure to the clamp when the nut is engaged with the lead screw and to vent the clamp when the nut is disengaged from the lead screw.

26. Thread cutting apparatus comprising a bed, means on the bed for holding and rotating work to be threaded, a carriage movable on the bed toward and away from said means, a die head on the carriage having chasers mounted for inward and outward movement relative to the work, a shaft carried by the carriage and extending transversely of the carriage, a pinion rotary on the shaft, a lost-motion connection between the pinion and the shaft, a rack extending longitudinally of the bed engageable by the pinion, a train of gears carried by the carriage driven by the shaft, means driven by the train for moving the chasers in and out, the pinion being adapted to roll on the rack upon movement of the carriage in thread-cutting direction and acting through said lost-motion connection when the lost motion therein is taken up to drive the train of gears to effect movement of the chasers to cut a taper thread, fluid pressure means carried by the carriage for driving the shaft and operable independently of the pinion to drive the shaft to the extent permitted by the lost-motion connection at the termination of a thread cutting operation for effecting quick retraction of the chasers from the work, the rack being carried by and movable longitudinally relative to the carriage, a fluid-pressure-controlled clamp shiftable to different positions on the bed and adapted to be clamped by fluid pressure at different positions on the bed for holding the rack against movement while the carriage moves forward, a lead screw extending longitudinally of the bed, a nut carried by the carriage releasably engageable with the lead screw, means carried by the carriage for manually engaging the nut with the lead screw, fluid pressure means carried by the carriage for disengaging the nut from the lead screw, fluid pressure means for moving the carriage rearward to return it to a retracted position, a trip on the rack, a stop valve carried by the carriage rearward of the trip, a reset valve carried by the carriage forward of the trip, said valves being longitudinally adjustable relative to one another on the carriage to vary the distance therebetween to correspond to a desired thread length, said valves being connected in a fluid pressure system including the fluid pressure means for driving the shaft, the clamp, the fluid pressure means for disengaging the nut from the lead screw, and the fluid pressure means for returning the carriage, said system further including a valve operable by the nut-engaging means to supply pressure to the clamp when the nut is engaged with the lead screw and to vent the clamp when the nut is disengaged from the lead screw, said stop valve upon engagement with the trip acting to effect successive operation of the fluid pressure means for driving the shaft in one direction, the fluid pressure nut-disengaging means, and the fluid pressure carriage return means, said reset valve upon engagement with the trip acting to effect operation of the fluid pressure means for driving the shaft in the opposite direction and venting of the fluid pressure nut-disengaging means to allow resetting thereof.

27. Thread cutting apparatus comprising a bed, means on the bed for holding and rotating work to be threaded, a carriage movable on the bed toward and away from said means, a die head on the carriage having chasers mounted for inward and outward movement relative to the work, means for moving the chasers in and out including a train of gears carried by the carriage and movable therewith and having a pinion engageable with a rack extending longitudinally of the bed, the rack being adapted to be fixed in position with respect to the bed so that upon movement of the carriage on the bed the pinion rolls on the rack to effect rotation of the gears, the rack being carried by and movable longitudinally relative to the carriage, and stop means mounted on the bed and shiftable to different positions longitudinally of the bed for holding the rack against movement while the carriage moves.

28. Thread cutting apparatus as set forth in claim 27 wherein the stop means comprises a clamp which may be clamped to the bed to hold it fixed on the bed and which may be released for shifting to different positions on the bed.

29. Thread cutting apparatus as set forth in claim 27 wherein the train of gears includes speed selector means.

30. Thread cutting apparatus as set forth in claim 27 wherein the pinion is movable into and out of engagement with the rack.

References Cited in the file of this patent

UNITED STATES PATENTS

| | | |
|---|---|---|
| 178,071 | Martin | May 30, 1876 |
| 1,444,109 | Clay | Feb. 6, 1923 |
| 1,460,088 | Wilson | June 26, 1923 |
| 1,616,542 | Nonneman | Feb. 8, 1927 |
| 1,859,882 | Nonneman | May 24, 1932 |
| 2,318,177 | Mathias | May 4, 1943 |
| 2,551,517 | Webb | May 1, 1951 |
| 2,581,082 | Drissner | Jan. 1, 1952 |

FOREIGN PATENTS

| | | |
|---|---|---|
| 441,303 | Great Britain | Jan. 16, 1936 |